United States Patent [19]
Finnegan

[11] Patent Number: 5,687,783
[45] Date of Patent: Nov. 18, 1997

[54] ANIMAL WATERING DEVICE

[76] Inventor: Michael E. Finnegan, 805 Erickson Dr., Kingman, Ariz. 86401-5440

[21] Appl. No.: 515,297

[22] Filed: Aug. 15, 1995

[51] Int. Cl.$^6$ ................................................. A01K 7/00
[52] U.S. Cl. ...................... 141/364; 119/77; 222/457; 137/454
[58] Field of Search ................... 141/324–327, 141/346–348, 351, 230, 363–366, 375; 119/77, 51.5, 74, 81; 137/453, 454; 222/457, 585–589

[56] References Cited

U.S. PATENT DOCUMENTS

| | | | |
|---|---|---|---|
| D. 254,454 | 3/1980 | Clugston | D30/16 |
| D. 350,842 | 9/1994 | VanSkiver | D30/121 |
| D. 374,516 | 10/1996 | Lillelund et al. | D30/132 |
| 1,433,939 | 10/1922 | Cordley et al. | 222/457 X |
| 1,535,154 | 4/1925 | Hatton | 119/77 |
| 1,785,921 | 12/1930 | Thompson et al. | 119/77 |
| 1,801,932 | 4/1931 | Miller | 119/77 |
| 1,812,530 | 6/1931 | Healy | 119/77 |
| 1,834,516 | 12/1931 | Dains | 119/77 |
| 1,851,278 | 3/1932 | Hearn | 119/77 |
| 1,879,264 | 9/1932 | Hughes et al. | 119/77 |
| 2,000,354 | 5/1935 | Sherman | 137/453 X |
| 2,078,203 | 4/1937 | Manning | 137/453 X |
| 2,086,341 | 7/1937 | Tolley | 119/77 |
| 2,251,507 | 8/1941 | Veith | 119/77 |
| 2,364,991 | 12/1944 | Marshall | 119/77 |
| 2,573,802 | 11/1951 | Mitchell | 119/77 |
| 2,618,237 | 11/1952 | McDermott et al. | 119/18 |
| 2,702,528 | 2/1955 | Lehmann | 119/77 |
| 2,767,960 | 10/1956 | Fast | 222/457 X |
| 3,016,044 | 1/1962 | Sollars | 119/80 |
| 3,112,733 | 12/1963 | Arnott | 119/77 |
| 3,590,857 | 7/1971 | Gruett | 137/454 |
| 3,720,184 | 3/1973 | Pearce | 119/51.5 |
| 3,730,141 | 5/1973 | Manning et al. | 119/51.5 |
| 4,034,715 | 7/1977 | Arner | 119/51.5 |
| 4,134,365 | 1/1979 | Puters et al. | 119/51.5 |
| 4,148,155 | 4/1979 | Allen | 47/59 |
| 4,192,256 | 3/1980 | Clugston | 119/51.5 |
| 4,281,624 | 8/1981 | Raines | 119/52 R |
| 4,450,790 | 5/1984 | Stansbury, Jr. | 119/51.12 |
| 4,541,363 | 9/1985 | Paoluccio | 119/77 |
| 4,573,434 | 3/1986 | Gardner | 119/77 |
| 4,721,063 | 1/1988 | Atchley | 119/52 R |
| 4,762,086 | 8/1988 | Atchley | 119/18 |
| 4,840,143 | 6/1989 | Simon | 119/52 R |
| 5,086,805 | 2/1992 | DeForest, III | 137/341 |

FOREIGN PATENT DOCUMENTS

| | | | |
|---|---|---|---|
| 682630 | 3/1964 | Canada | 119/74 |
| 353258 | 9/1905 | France | 119/77 |
| 2227819 | 11/1974 | France | 119/77 |
| 2363281 | 3/1978 | France | 119/51.5 |
| 13124 | 7/1895 | United Kingdom | 137/454 |
| 750870 | 6/1956 | United Kingdom | 137/454 |
| 2241633 | 11/1991 | United Kingdom | 119/77 |

OTHER PUBLICATIONS

Delta Airlines Magazine, "Pet's Treat Machine", p. 9, Nov. 1994.

Starcrest of California Automatic Feeder & Water Brochure, May 1986.

*Primary Examiner*—J. Casimer Jacyna
*Attorney, Agent, or Firm*—Steven G. Lisa; Louis J. Hoffman

[57] ABSTRACT

A pet watering apparatus and method for automatically supplying pets with an ample quantity of safe, fresh drinking water is disclosed. Water is maintained in and flows between two connected vessels. A commercially available, plastic or glass water bottle is placed in an inverted position on top of one vessel, that acts as a water storage vessel. Drinking water for the animal in the second vessel is automatically kept at the same level at the bottom of the inverted water bottle's neck. When the level drops below the neck of the water bottle, the laws of physics will allow the pet's drinking water to automatically fill to the original position, thus creating a readily available supply of drinking water for the pet. A one-way water value separates the stored water in the first vessel from the available drinking water in the second vessel so that the stored water supply will not become contaminated with bacterial agents or other contaminates from the drinking vessel. The apparatus includes a quick-disconnect feature that allows easy separation of the drinking and storage vessels, along with either a manual or automatic shut-off of water flow upon such a separation.

12 Claims, 3 Drawing Sheets

ANIMAL WATERING DEVICE

FIELD OF INVENTION

This invention relates to pet water dispensers for automatically providing water to animals over a long period of time, and, more particularly, to a pet water dispenser that utilizes a one-way, separator valve between water vessels so that the stored water supply does not become contaminated with infectious agents commonly associated with animals' drinking water, and is easily separated without spilling water, for ease of cleaning.

BACKGROUND INFORMATION

Animal owners must constantly deal with the annoyance of their pet care responsibilities. It is important that owners provide their pets with a constant supply of fresh, uncontaminated drinking water. Recently, veterinarians have advised pet owners that regular tap water may not be suitable for pets because of the high sodium content and hardness factor that eventually will cause pets to develop kidney stones. Therefore, in order to properly care for a pet, present owners not only must provide fresh drinking water, but owners also need to be aware of the pet's water content. The present invention solves the above problem by providing pet owners with an apparatus that enables owners to easily supply their pets with either fresh, uncontaminated tap water; or, if owners prefer, uncontaminated, commercially-filtered water.

The prior art relating to pet water dispensers is directed primarily to devices utilizing a specially made storage tank and means for making the water in the storage tank available to animals. Such devices may automatically provide animals with water but not an ample supply for a long period of time. Past systems do not provide a device that will keep the stored water from becoming contaminated with bacterial agents or other foreign matter from the pet's drinking bowl. The present invention implements a one-way valve system so that the available drinking water will not contaminate the fresh drinking water that is stored for the animal. The invention also includes a manual or automatic quick disconnect valve that allows for removal of the drinking bowl for cleaning without losing or spilling water retained in the storrage container. The result is a pet water dispenser with considerably less maintenance requirements and one that provides the animal with a constant, healthy and ample supply of drinking water.

SUMMARY OF THE INVENTION

The pet watering apparatus of the present invention is designed to automatically provide fresh water to animals for drinking. The apparatus is made from two, attached/attachable, water holding vessels that are connected by a one-way water valve. One vessel is to serve as the animal's drinking bowl. The second vessel supports an inverted water storage container, such as commercially available three and five gallon water bottles or jugs, and is connected to the first vessel via a one-way valve. The second vessel retains a set amount of water so that the stored water does not flow out the three/five gallon bottle unless the level in the drinking vessel drops below a preset level. The water valve is regulated by the water pressure on either side of the valve, and fulfills the purpose of keeping the stored water sanitary. In addition, the valve is designed to allow for a quick and easy separation of the two vessels so that cleaning the apparatus can be done with ease without losing the stored water. The suggested water storage container is a commercial, three or five gallon, plastic or glass water bottle. The three/five gallon storage container serves as a long term water storage device.

The pet watering system is initially set-up by inverting a full three/five gallon bottle on top of the storage vessel that serves as the bottle supporter. A small amount of water will flow from the water bottle into the vessel until the neck of the bottle is submerged in the water. The water bottle is then deprived of its air intake, thus causing the water level to stay at a constant level in the first vessel.

The one-way valve will allow water to flow into the second vessel designated for drinking. As soon as a sufficient amount of water has been consumed or evaporated from the drinking vessel, the pressure-regulated valve will allow fresh water to flow into the drinking vessel. The one-way valve does not allow water to enter the water storage area. Once enough water has been consumed from the drinking vessel, the water level in the storage vessel will fall below the neck of the water bottle, thus allowing: (1) air to enter the water bottle; and, (2) fresh, clean water to flow into the vessels.

OBJECTS OF THE INVENTION

It is therefore a principle object of this invention is provide a non-contaminated, fresh, clean, ample supply of drinking water to animals for a long period of time.

Another object of this invention is provide a pet watering system and method that utilizes a commercially available, plastic or glass water bottle as a fresh water storage tank.

Another object of the invention is to implement a one-way valve system that only permits water to flow from the storage vessel to the drinking vessel.

It is a further object of this invention to implement the one-way valve with an automatic shut off when separated to permit cleaning of the drinking vessel without losing the stored water.

Another object of this invention is to provide a pet watering system and method that provides for storage of fresh water and automatic dispensing of said fresh water without the introduction of contaminants from the open pet water drinking vessel.

A further object of this invention is to provide a pet watering device at a low cost to the consumer.

It is a further object of this invention to implement the one way valve with a quick disconnect feature to allow easy separation of the drinking and storage vessels.

Additional objects of the invention and advantages of the invention will become apparent as the following detailed description of the preferred embodiment is read in conjunction with the accompanying drawings which illustrate such a preferred embodiment.

DESCRIPTION OF THE PREFERRED EMBODIMENT

Figure 1:
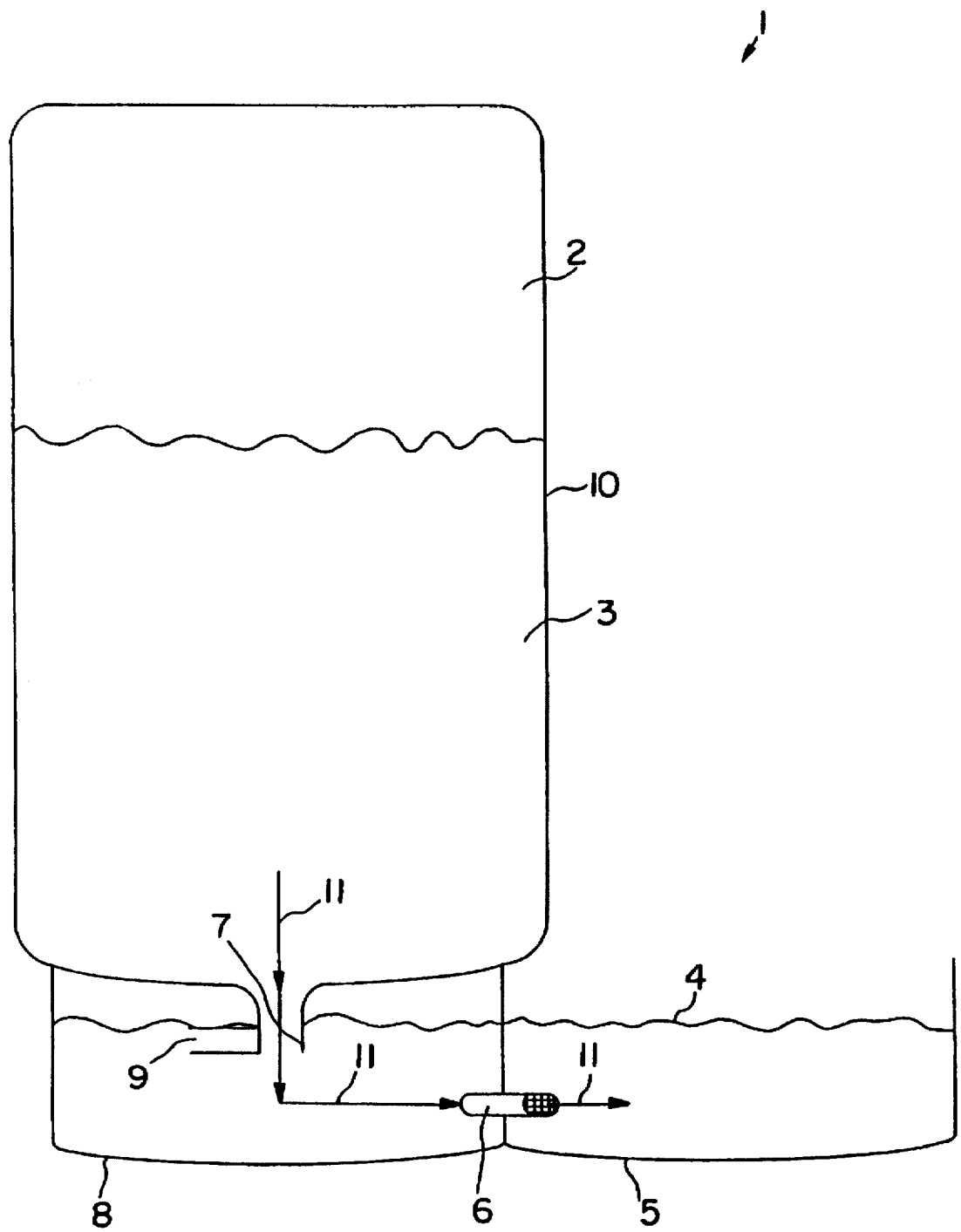
FIG. 1 shows a cross-sectional view of the pet watering apparatus of the present invention.

Referring now to the drawings, the pet watering apparatus of the present invention is designated generally by the number 1. Apparatus 1 is comprised of a plastic/glass, three/five gallon water bottle, and two water retaining vessels. The first vessel supports the water bottle and functions as a storage vessel for fresh, uncontaminated water. The second vessel acts as drinking vessel and provides fresh water to the animal. The preferred form of the two vessels is ceramic, but many other materials would suffice as possible substitutes (i.e. plastic, glass, molding, etc.) The vessels of apparatus 1 may be permanently attached or two separate vessels that are made attachable via a valve connection. The later form (valve connection) is preferred so that cleaning of the apparatus 1 is easily performed.

FIG. 1 represents a working model of the present invention. The ⅗ gallon water bottle, designated by the numeral 10, is set in an inverted position upon the storage vessel, designated by the numeral 8, configured to support the bottle 10. The numeral 4 designates the water level in the vessels after putting the ⅗ gallon water bottle 10 in place. Numeral 9 represents the required length of water bottle neck, designated by the numeral 7, that is to be submerged into the water 4. It is necessary that the neck 7 of the water bottle 10 be submerged into the water 4, but above the one-way, pressure regulated valve, designated by the numeral 6. Numeral 2 designates the evacuated volume that is created by placing the neck of the bottle in the appropriate area between water level 4 and one-way, pressure regulated valve 6. Numeral 3 designates the amount of water that is left in water storage bottle 10. Numeral 11 designates the flow of water from water storage bottle 10 through the storage vessel, designated by the numeral 8, through a one-way, pressure regulated valve 6, and into the drinking vessel, designated by the numeral 5.

Figure 2:
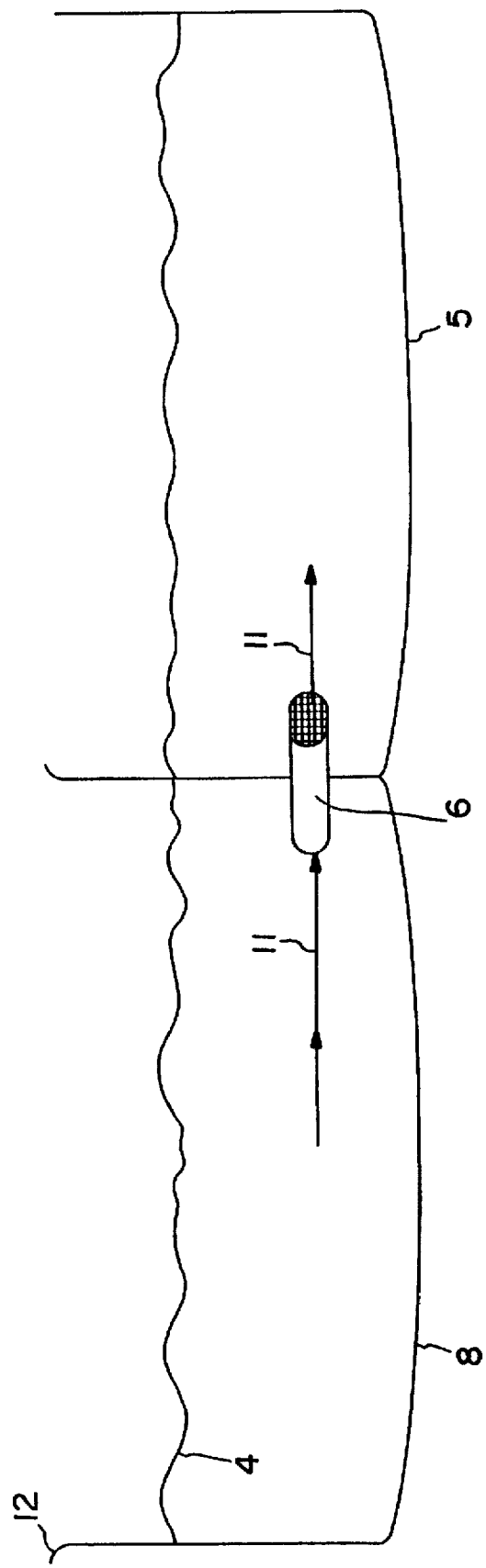
FIG. 2 shows the same cross-sectional view of FIG. 1 without the replaceable water storage container.

FIG. 2 represents another cross-sectional view of the present invention, but lacks the ⅗ gallon water storage bottle, represented by 10 in FIG. 1. Numeral 12 designates the rim of storage vessel 8. The rim 12 helps to support the inverted water bottle 10 (FIG. 1) so that the bottle will not tip over and spill. The height of the rim 12 above the bottom of the storage vessel 8 is designed to place the mouth of storage bottle 10 (FIG. 1) above the valve 6. As illustrated in FIG. 1, numeral 4 designates the attained water level, numeral 8 designates the storage vessel, numeral 11 designates the flow of water, numeral 6 designates the one-way, pressure-regulated valve, and numeral 5 designates the animal's drinking vessel.

Figure 3:
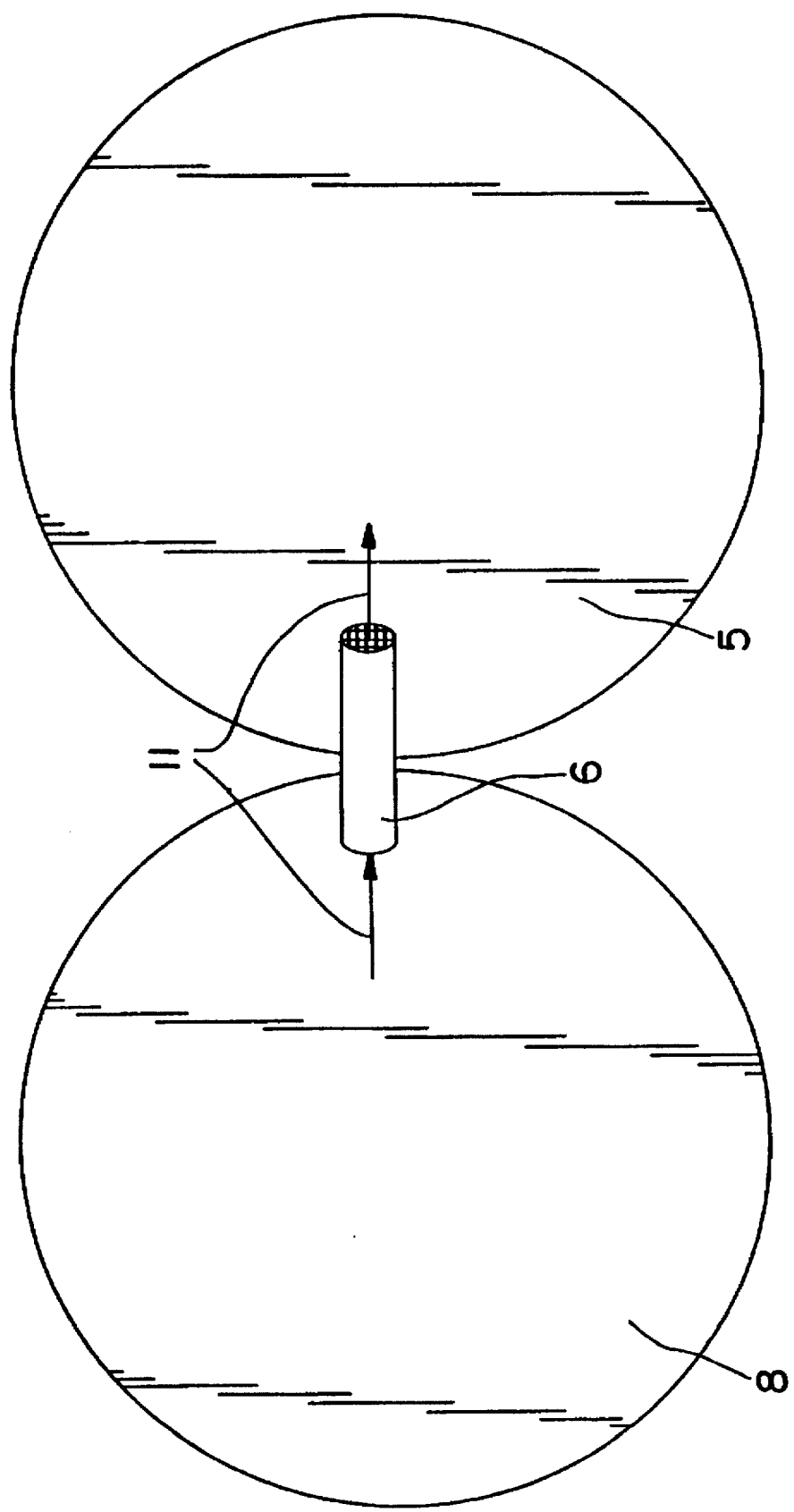
FIG. 3 shows a top view of FIG. 2 with the one-way valve connection visible.

FIG. 3 represents a top view of FIG. 2 illustrating more clearly the connection of the valve between the two water vessels. Numeral 8 designates the storage vessel, and numeral 5 designates the drinking vessel. Numeral 6 designates the one-way, pressure regulated quick disconnect valve that connects the two vessels. In addition to regulating the flow of water, the valve 6 will also function as connecter between the two vessels 5,8. The valve 6 is designed so that it will automatically close when said vessels 5,8 are separated. If desired, a manual shut-off valve can be used to block the flow of water when the vessels 5,8 are separated. This process allows the pet owner to clean the drinking vessel while avoiding the start up process described above. The arrows designated by numeral 11 show the direction of the water flow from the storage vessel 8 to the drinking vessel 5.

In operation, a full, ⅗ gallon, plastic/glass water bottle is inverted onto the storage vessel 8. An evacuated volume 2 is created in the water bottle 10, and the flow of water is naturally stopped. As the animal drinks water out of the drinking vessel 5, a pressure difference between the two vessels is created, which allows the one-way valve to release water from the storage vessel 8 into the drinking vessel 5. Once the water level in the storage vessel 8 falls below the neck of the water bottle 7, water will be allowed to flow from the water bottle into the storage vessel 8, and air will be allowed into the water bottle 10, until the water in storage vessel 8 rises above the level of the neck 7, which replaces the vacuum-lock on the flow of water. The one-way valve 6 prevents contaminated water from drinking vessel 5 from flowing backwards into storage vessel 8 and contaminating the fresh supply of water in the bottle 10. This process is automatically repeated when water is removed from the drinking water vessel 5; thus, a cycle is created that enables the animal owner to supply his/her pet with an ample supply of fresh drinking water from a non-contaminated source for an extended period of time. It is recommended to clean the entire apparatus 1 with each new bottle of water 10, but the drinking vessel 5 should be cleaned more often by removing the drinking vessel 5 from the storage vessel 8. The valve 6 includes any conventional manual or automatic shut-off feature that causes the valve to close when the vessels 5,8 are separated. For example, either a slide or rotating manual valve, or a pressure or electrically operated automatic valve can be used to shut off the water flow and allow for proper cleaning.

The one-way water control valve 6 is implemented to remain closed when the water levels in the storage vessel 8 and the drinking vessel 5 are equal, thus preventing the flow of contaminates from the drinking vessel into the storage vessel and, in-turn, into the plastic/glass water bottle source of fresh, uncontaminated water 3. The valve 6 opens when the pressure in the storage vessel 8 exceeds the pressure in the drinking vessel 5 by a predetermined amount, thus permitting fresh water to flow into the drinking vessel. The valve 6 also serves as a connector between the two vessels 5,8 and includes either a manual (e.g., slide or rotating valve) or automatic (e.g., spring loaded) shut off. Any automatic or manual shut off mechanism may be used to allow for disconnecting the vessels 5,8 for cleaning so the drinking vessel 8 may be separated for easy cleaning.

It can be seen, therefore, that the pet watering apparatus and method of the present invention is well adapted to carry out the objects and advantages mentioned, as well as those inherent therein. While a presently preferred embodiment of the invention has been described for the purposes of this disclosure, numerous changes in the construction and arrangement of the features may be made by those skilled in the art. For example, any appropriate one-way valve can be used between the vessels, as long as it allows water to flow from the storage vessel to the drinking vessel. Similarly, the storage vessels and the water bottle may be made from any appropriate material including, for example, plastic, glass, or ceramic. All such changes are encompassed in the scope and spirit of this invention as defined by the appended claims.

What is claimed is:

1. A portable apparatus for dispensing fresh water to animals comprising:

(a) a portable drinking vessel having a rim and a substantially flat base;

(b) a portable storage vessel adjoining the drinking vessel and having a substantially flat base and a rim configured to support an industry-standard water source bottle;

(c) a water passage connecting the drinking vessel to the storage vessel;

(d) wherein the substantially flat bases of the two vessels are substantially coplanar and are configured to support the apparatus on a flat surface; and (e) an automatic one-way valve disposed in the water passage and oriented so that water can flow through the valve from the storage vessel to the drinking vessel when pressure in the storage vessel exceeds the pressure in the drinking vessel by a predetermined amount but so that water cannot flow from the drinking vessel to the storage vessel.

2. The apparatus of claim 1 wherein the one-way valve is a pressure-sensitive valve that opens automatically only in response to a decreasing water level in the drinking vessel.

3. The apparatus of claim 1 wherein the one-way valve is positioned between the storage vessel and the drinking vessel at a height part way between the rim and the base of the drinking vessel.

4. The apparatus of claim 3 further comprising an industry-standard source bottle supported by the rim of the storage vessel and having a downwardly directed opening that ends at a height above the one-way valve.

5. The apparatus of claim 4 wherein the one-way valve includes an automatic shut-off valve that prevents flow of water from the storage vessel when the drinking vessel is separated from the storage vessel.

6. The apparatus of claim 1 wherein the one-way valve is removable.

7. The apparatus of claim 1 wherein the two vessels are formed as separate units joined together, with the one-way valve passing through the joint.

8. The apparatus of claim 7 wherein the one-way valve includes a shut-off valve and wherein the valve is removable from the vessels.

9. The apparatus of claim 8 wherein the one-way valve is an automatic valve structured to close upon separation of the two vessels.

10. The apparatus of claim 1 wherein the two vessels are formed together as a unitary structure with a common wall forming a connection therebetween.

11. The apparatus of claims 10 wherein the unitary structure is ceramic.

12. The apparatus of claim 10 wherein the storage vessel abuts the drinking vessel and the two vessels are secured together.

* * * * *